(12) United States Patent
Saxena et al.

(10) Patent No.: US 12,379,966 B2
(45) Date of Patent: Aug. 5, 2025

(54) GRAPH EXECUTION ENGINE

(71) Applicant: Google LLC, Mountain View, CA (US)

(72) Inventors: Ashish Saxena, London (GB); Juan Antonio Navarro Perez, London (GB); Pavel Shmakov, London (GB); Cyril Chimisov, London (GB); Vinsensius B. Vega S Naryanto, Zurich (CH); Matej Rizman, London (GB); Matthew Pearce, London (GB)

(73) Assignee: Google LLC, Mountain View, CA (US)

( * ) Notice: Subject to any disclaimer, the term of this patent is extended or adjusted under 35 U.S.C. 154(b) by 791 days.

(21) Appl. No.: 17/644,079

(22) Filed: Dec. 13, 2021

(65) Prior Publication Data
US 2023/0185622 A1    Jun. 15, 2023

(51) Int. Cl.
*G06F 9/50* (2006.01)
*G06Q 40/06* (2012.01)

(52) U.S. Cl.
CPC ........... *G06F 9/5044* (2013.01); *G06Q 40/06* (2013.01); *G06F 2209/501* (2013.01)

(58) Field of Classification Search
None
See application file for complete search history.

(56) References Cited

U.S. PATENT DOCUMENTS

| | | | |
|---|---|---|---|
| 7,409,656 B1 * | 8/2008 | Ruehl | G06F 8/45 716/112 |
| 2019/0036544 A1 * | 1/2019 | Young | H03M 7/60 |
| 2019/0266504 A1 * | 8/2019 | Apparao | G06N 3/063 |
| 2019/0325524 A1 * | 10/2019 | Gebara | G06Q 40/06 |
| 2020/0249998 A1 * | 8/2020 | Che | G06N 20/00 |
| 2020/0301898 A1 | 9/2020 | Samynathan et al. | |
| 2021/0319298 A1 * | 10/2021 | Pemmaraju | G06N 3/063 |
| 2022/0091829 A1 * | 3/2022 | Silva | G06F 11/3409 |

OTHER PUBLICATIONS

J. Xue, Z. Yang, S. Hou and Y. Dai, "Processing Concurrent Graph Analytics with Decoupled Computation Model," in IEEE Transactions on Computers, vol. 66, No. 5, pp. 876-890, May 1, 2017 (Year: 2017).*

(Continued)

*Primary Examiner* — Frank D Mills
(74) *Attorney, Agent, or Firm* — Shumaker & Sieffert, P.A.

(57) ABSTRACT

A method includes obtaining a graph that includes a plurality of nodes each representing a computational job and connected to one or more other nodes via edges. Each edge represents a dependency between two connected nodes. For each computing device of a distributed computing system, the method includes obtaining resource characteristics. The method includes slicing, based on the dependencies of connected nodes, the graph into a plurality of sub-graphs each including one or more nodes. For each respective sub-graph, the method includes determining a computational cost of the respective sub-graph and distributing, based on the computational cost and the resource characteristics, the respective sub-graph to the respective one of the computing devices. The method includes receiving a respective result from the respective one of the computing devices based on execution of the computational jobs. The method includes determining a total result based on each respective result.

22 Claims, 7 Drawing Sheets

(56) References Cited

OTHER PUBLICATIONS

Angerd, Alexandra, Keshav Balasubramanian, and Murali Annavaram. "Distributed training of graph convolutional networks using subgraph approximation." arXiv preprint arXiv:2012.04930 (2020). (Year: 2020).*

International Search Report and Written Opinion for the related Application No. PCT/US2022/081219, dated Mar. 7, 2023, 68 pages.

Response to Communication Pursuant to Rules 161(1) and 162 EPC dated Jul. 23, 2024, from counterpart European Application No. 22847496.1, filed Jan. 16, 2025, 51 pp.

* cited by examiner

GRAPH EXECUTION ENGINE

TECHNICAL FIELD

This disclosure relates to graph execution engines.

BACKGROUND

It is increasingly common for businesses and other entities to have need to perform a large number of computations frequently and rapidly. For example, financial institutions often are required to compute a value of a financial portfolio that includes hundreds of thousands or millions of different instruments. These institutions currently rely on manually dividing the instruments into batches and distributing the batches to large compute farms or other distributed computing systems to compute these values.

SUMMARY

One aspect of the disclosure provides a computer-implemented method when executed by data processing hardware causes the data processing hardware to perform operations. The operations include obtaining a graph including a plurality of nodes. Each node represents a computational job and is connected to one or more other nodes via edges. Each edge represents a dependency between two connected nodes. For each of multiple computing devices of a distributed computing system, the operations include obtaining resource characteristics. The operations also include slicing, based on the dependencies of connected nodes, the graph into a plurality of sub-graphs. Each sub-graph includes one or more nodes of the plurality of nodes. For each respective sub-graph of the plurality of sub-graphs, the operations include determining a computational cost of the respective sub-graph and distributing, based on the computational cost of the respective sub-graph and the resource characteristics of obtained for each of the multiple computing devices of the distributed computing system, the respective sub-graph to a respective one of the computing devices. The operations also include receiving a respective result from the respective one of the computing devices. The respective result is based on execution of the computational jobs of the one or more nodes of the sub-graph by the respective one of the computing devices. The operations also include determining a total result based on each respective result.

Implementations of the disclosure may include one or more of the following optional features. In some implementations, the operations further include, prior to obtaining the graph, receiving a request to determine a total value of a financial portfolio. The financial portfolio includes a plurality of instruments. In these implementations, the total result may include the total value of the financial portfolio. In some examples, the operations further include determining a risk of the financial portfolio. Here, the risk is based on a derivative of a function of one or more of the computational jobs represented by the plurality of nodes.

Optionally, the resource characteristics include at least one of central processing unit (CPU) resources, graphical processing unit (GPU) resources, or memory resources. In some examples, the computational cost includes at least one of an amount of CPU resources required to execute the computational jobs represented by the one or more nodes of the respective sub-graph, an amount of GPU resources required to execute the computational jobs represented by the one or more nodes of the respective sub-graph, or an amount of memory resources required to execute the computational jobs represented by the one or more nodes of the respective sub-graph.

In some implementations, determining the total result includes summing each respective result. Execution of the computational jobs represented by the one or more nodes of the respective sub-graph by the respective one of the computing devices may include performing automatic differentiation. In some examples, distributing the respective sub-graph to the respective one of the computing devices includes determining whether to execute the respective sub-graph using a CPU or a GPU. In these examples, determining whether to execute the respective sub-graph using the CPU or the GPU may include estimating a performance of the CPU when executing the respective sub-graph, estimating a performance of the GPU when executing the respective sub-graph, and comparing the performance of the CPU and the performance of the GPU. Determining whether to execute the respective sub-graph using the CPU or the GPU may be based on dependencies of the respective sub-graph.

Another aspect of the disclosure provides a system for performing large-scale computations using a computational graph. The system includes data processing hardware and memory hardware in communication with the data processing hardware. The memory hardware stores instructions that when executed on the data processing hardware cause the data processing hardware to perform operations. The operations include obtaining a graph including a plurality of nodes. Each node represents a computational job and is connected to one or more other nodes via edges. Each edge represents a dependency between two connected nodes. For each of multiple computing devices of a distributed computing system, the operations include obtaining resource characteristics. The operations also include slicing, based on the dependencies of connected nodes, the graph into a plurality of sub-graphs. Each sub-graph includes one or more nodes of the plurality of nodes. For each respective sub-graph of the plurality of sub-graphs, the operations include determining a computational cost of the respective sub-graph and distributing, based on the computational cost of the respective sub-graph and the resource characteristics of obtained for each of the multiple computing devices of the distributed computing system, the respective sub-graph to a respective one of the computing devices. The operations also include receiving a respective result from the respective one of the computing devices. The respective result is based on execution of the computational jobs of the one or more nodes of the sub-graph by the respective one of the computing devices. The operations also include determining a total result based on each respective result.

This aspect may include one or more of the following optional features. In some implementations, the operations further include, prior to obtaining the graph, receiving a request to determine a total value of a financial portfolio. The financial portfolio includes a plurality of instruments. In these implementations, the total result may include the total value of the financial portfolio. In some examples, the operations further include determining a risk of the financial portfolio. Here, the risk is based on a derivative of a function of one or more of the computational jobs represented by the plurality of nodes.

Optionally, the resource characteristics include at least one of CPU resources, GPU resources, or memory resources. In some examples, the computational cost includes at least one of an amount of CPU resources required to execute the computational jobs represented by the one or more nodes of the respective sub-graph, an amount of GPU resources required to execute the computational jobs represented by the one or more nodes of the respective sub-graph, or an amount of memory resources required to execute the computational jobs represented by the one or more nodes of the respective sub-graph.

In some implementations, determining the total result includes summing each respective result. Execution of the computational jobs represented by the one or more nodes of the respective sub-graph by the respective one of the computing devices may include performing automatic differentiation. In some examples, distributing the respective sub-graph to the respective one of the computing devices includes determining whether to execute the respective sub-graph using a CPU or a GPU. In these examples, determining whether to execute the respective sub-graph using the CPU or the GPU may include estimating a performance of the CPU when executing the respective sub-graph, estimating a performance of the GPU when executing the respective sub-graph, and comparing the performance of the CPU and the performance of the GPU. Determining whether to execute the respective sub-graph using the CPU or the GPU may be based on dependencies of the respective sub-graph.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
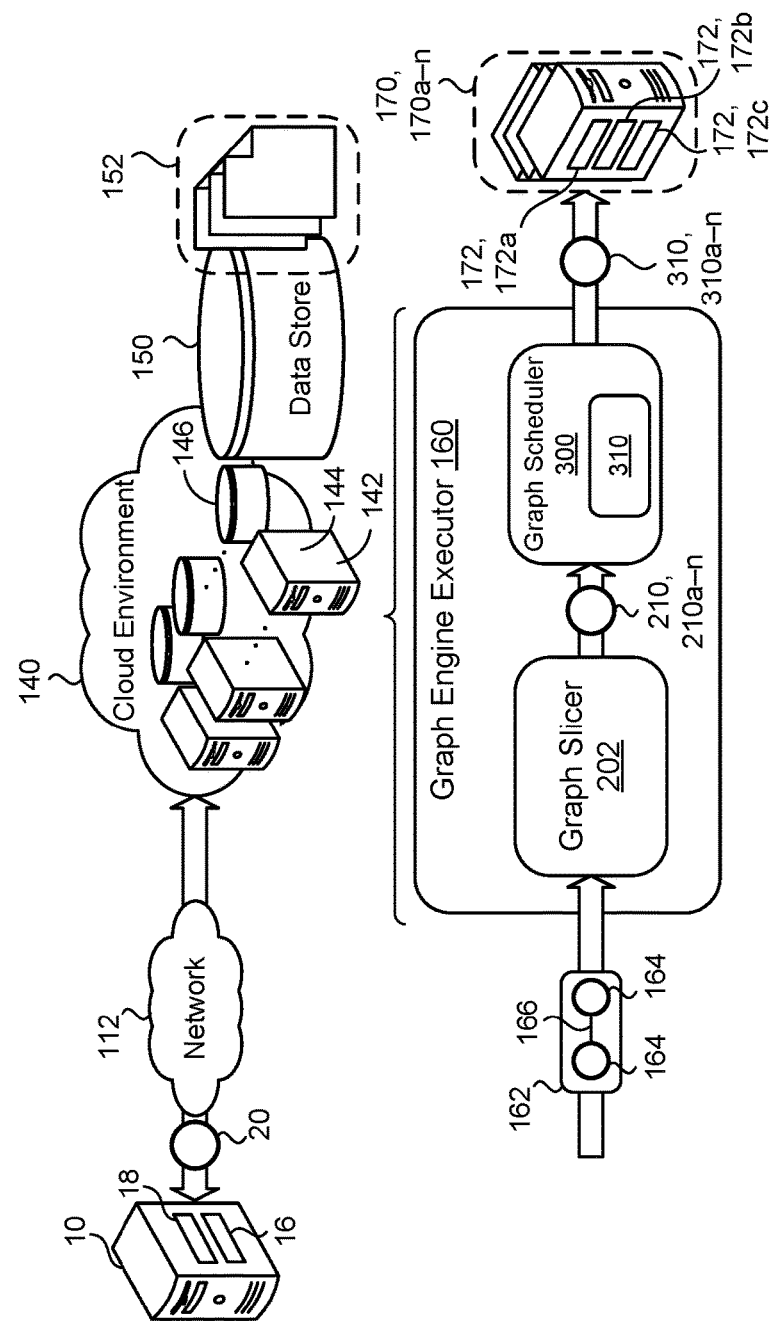
FIG. 1 is a schematic view of an example system for large-scale computing.

It is increasingly common to businesses and other entities to have need to perform a large number of computations frequently and rapidly. For example, financial institutions often are required to compute a value of a financial portfolio that includes hundreds of thousands or millions of different instruments. These institutions currently rely on manually dividing the instruments into batches and distributing the batches to large compute farms or other distributed computing systems to compute these values. These conventional methods not only often require substantial amounts of manual labor, they generally inefficiently use computing resources and/or rely on less accurate computational means (e.g., finite differences). Moreover, these methods are typically incapable of effectively leveraging the resources of particular computing devices (e.g., central processing units (CPUs), graphical processing units (GPUs), etc.).

Computational graphs are directed graphs that include nodes that each correspond to mathematical operations/computations. Nodes are connected via edges that establish dependencies (i.e., strict ordering) between nodes. Many deep learning frameworks rely on such computational graphs (e.g., TensorFlow, Torch, Theano, etc.) to implement methods such as backpropagation in machine learning models.

Implementations herein provide efficient evaluation of large scale mathematical calculations expressed as one or more independent or coupled computational graphs over a distributed computing system. A graph engine executor obtains a graph with a plurality of nodes connected by edges representing dependencies between connected nodes. The graph engine executor slices the graph into multiple sub-graphs that each includes one or more nodes. For each sub-graph, the graph engine executor determines a computational cost of the sub-graph and distributes the sub-graph to a computing device of a distributing system based on the computational cost and resources of the computing device. The computing devices of the distributed computing system determine a result for each sub-graph, and using the results, the graph engine executor determines a total result.

Thus, the graph engine executor supports fast evaluation of computational graphs (e.g., TensorFlow graphs) and abstracts away decisions on how to distribute computations among a set of resources (e.g., CPUs and GPUs) available from a distributed computing system. The graph engine executor supports "macro" computational graphs where outputs of individual computational graphs become inputs to other computational graphs. Macro graphs allow the graph engine executor to describe complex computations in a more structured and modular and allows reuse of intermediate computed values (e.g., internal nodes of the computational graphs).

The graph engine executor supports very large computational graphs which do not fit within the memory of a single computing device. That is, by slicing the computational graph into sub-graphs, the graph engine executor can bypass memory constraints imposed on conventional computational graphs. The graph engine executor joins the sub-graphs together after the computing devices of the distributed computing system process each sub-graph. The graph engine executor may identify and eliminate duplicate computations (or fragments of computations) by instead reusing intermediate values from other sub-graphs when possible.

Referring to FIG. 1, in some implementations, an example large-scale computation system 100 includes a remote system 140 in communication with one or more remote computing devices 10 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the computing device 10) or the computing resources 144.

Figure 4:
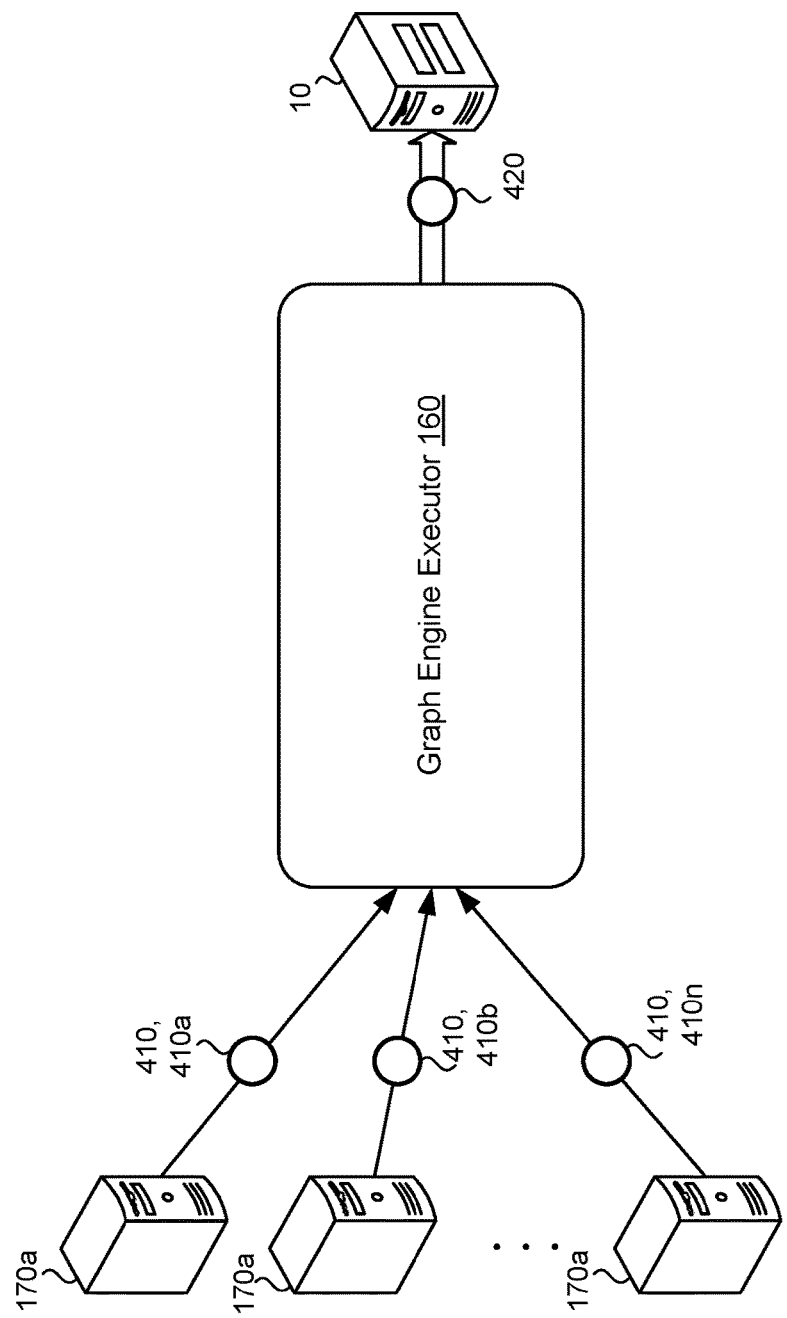
FIG. 4 is a schematic view of a graph engine executor receiving results from a distributed computing system.

The remote system 140 is configured to receive a computation request 20 from, for example, the remote computing device 10 via the network 112. The remote computing device 10 may correspond to any computing device, such as a server, a desktop workstation, a laptop workstation, or a mobile device (i.e., a smart phone). The remote computing device 10 includes computing resources 18 (e.g., data processing hardware) and/or storage resources 16 (e.g., memory hardware). The computing request 20 requests the remote system 140 to perform multiple computations to determine, in some implementations, a total result 420 (FIG. 4). For example, the remote computing device 10 may be associated with a financial institution and the computing request 20 may request the remote system 140 determine a total value and/or risk of a portfolio of thousands or millions of financial instruments. The value of these instruments may dependent on a large number of variables (e.g., time factors, interest rates, market sentiment, etc.).

The remote system executes a graph engine executor 160. The graph engine executor 160 obtains a computational graph 162 (also referred to herein as a graph 162) that includes multiple nodes 164. Each node 164 is connected to one or more other nodes 164 via edges 166 that represent dependencies between the connected nodes 164. For example, when a computational job represented by a first node 164 requires an output of a second computational job represented by a second node 164, the first node 164 and the second node 164 may be connected by an edge 166. The graph engine executor 160 may receive the graph 162 from another source (e.g., the remote computing device 10). Alternatively, the graph engine executor 160 may generate the graph 162 via a graph generating module (not shown) such as a graph processor or graph optimizer from data 152 stored at the data store 150 and/or received from the computing device 10. The graph engine executor 160 may generate the graph 162 in response to the request 20. Alternatively the graph engine executor 160 retrieves a pre-generated graph 162 in response to the request 20. In some examples, the graph engine executor 160 updates, modifies, or otherwise adjusts the graph 206 in response to data 152 (i.e., updates) from the remote computing device 10.

The graph 162 represents the computations requested by the computation request 20. Continuing the previous example, the graph 162 represents the computations (e.g., thousands or millions of computations) required to determine the value and/or risk of the financial portfolio using nodes 164 and edges 166. For example, the graph 162 includes the computations required to determine the value of each instrument within the portfolio, then summing the value of each instrument provides the total value of the portfolio.

The graph engine executor 160 includes a graph slicer 202. The graph slicer 202 receives the graph 162 and slices, based on the dependencies of the connected nodes 164 (i.e., based on the edges 166), the graph 162 into multiple sub-graphs 210, 210*a-n*. Each sub-graph 210 includes one or more nodes 164 of the graph 162. In some examples, based on the way the graph slicer 202 slices the graph 162, the sub-graphs 210 do not have dependencies with other sub-graphs 210. That is, each sub-graph 210 is independent from each other sub-graph 210 and may be executed without any results needed from other sub-graphs 210 (i.e., asynchronously).

Figure 2A:
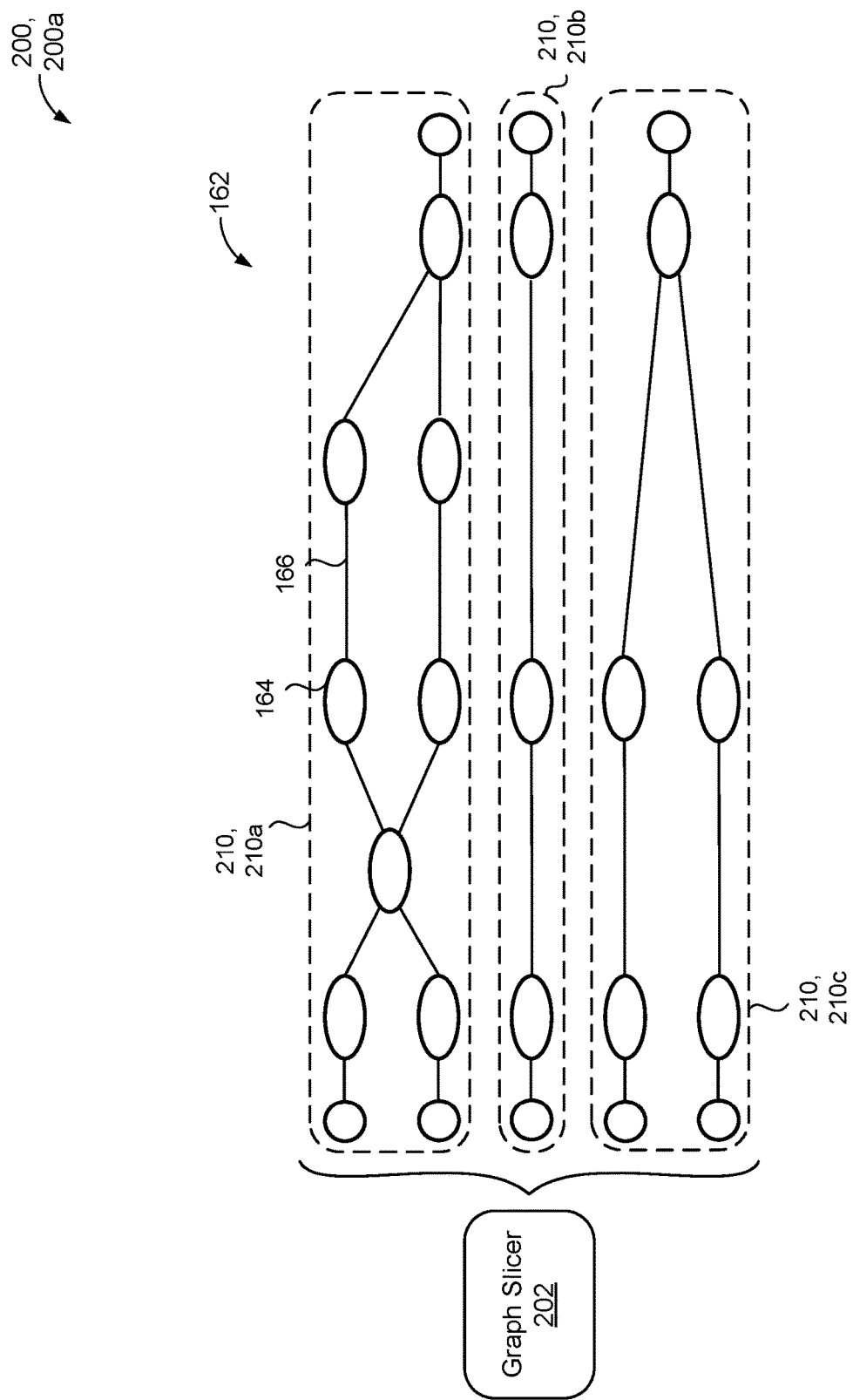
FIGS. 2A and 2B are schematic views of a graph slicer and a graph of the system of FIG. 1.

Referring now to FIG. 2A, schematic view 200, 200*a* includes an exemplary graph 162 that is sliced, by the graph slicer 202, into three sub-graphs 210, 210*a-c*. While this example illustrates a small graph 162 and only three sub-graphs 210, it is understood that the graph 162 can be any size (e.g., millions of nodes 164 and edges 166) and the graph slicer 202 may slice the graph 162 into any number of sub-graphs 210. The graph 162 may be too large to practically fit within the memory of a single computer. Here, the graph slicer 202 slices each of the sub-graphs 210*a-c* such that there are no dependencies across different sub-graphs 210. That is, each sub-graph 210 may be executed independently and in parallel. For example, the eleven nodes 164 within the sub-graph 210*a* are only dependent on other nodes 164 within the same sub-graph 210*a*. That is, none of the edges 166 of the sub-graph 210*a* connect with nodes 164 from other sub-graphs 210. Similarly, none of the edges 166 of the sub-graphs 210*b*, 210*c* connect with nodes 164 from different sub-graphs 210.

Figure 2B:
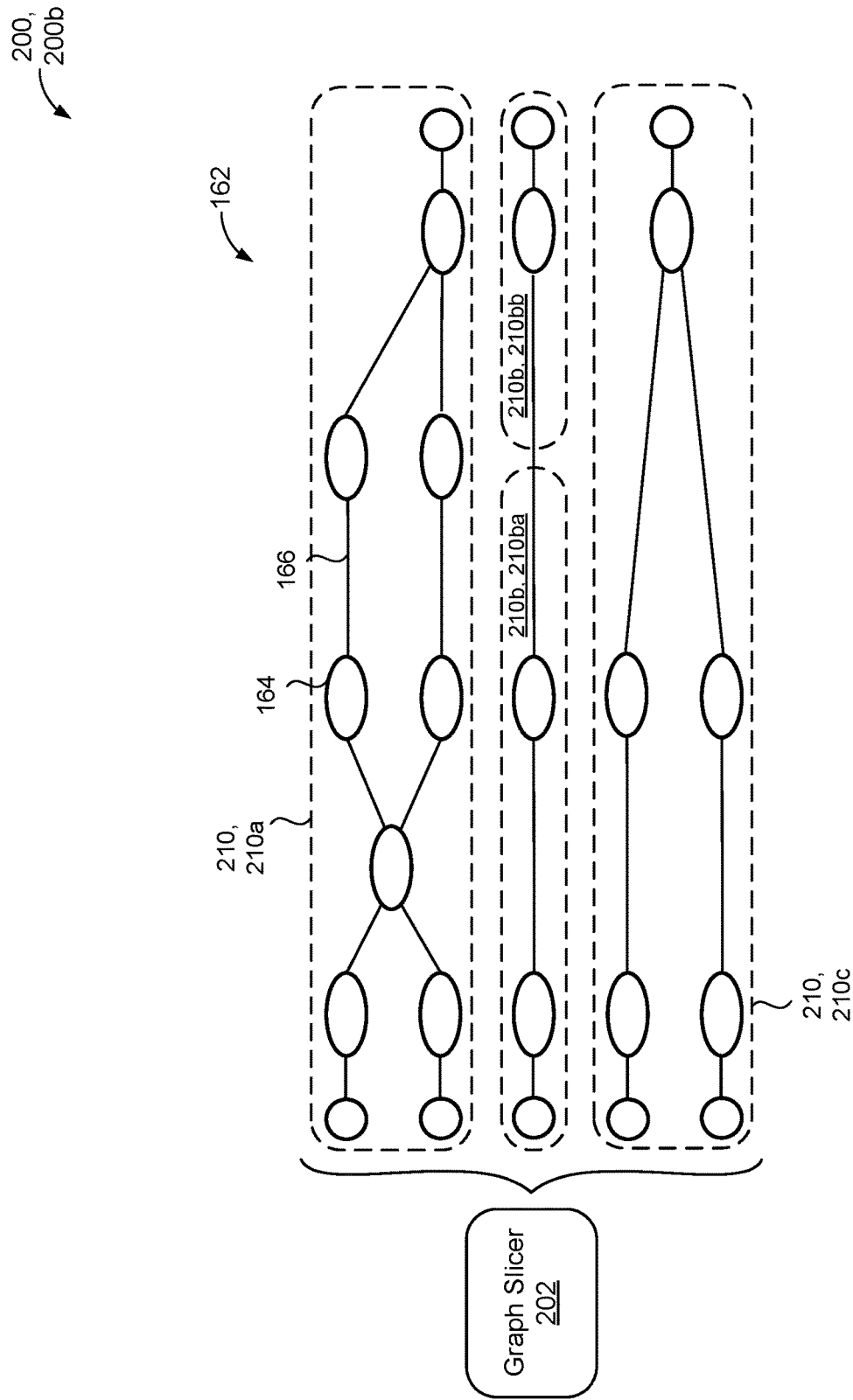

Referring now to FIG. 2B, in some examples, the graph slicer 202 slices the graph 162 into sub-graphs 210 that have one or more dependencies on other sub-graphs 210. For example, the graph slicer 202 may attempt to limit a size of a sub-graphs 210 by splitting the sub-graph into two sub-graphs 210 with one dependent on the other. It is important to note that, in this situation, the execution order of the sub-graphs 210 must be managed (i.e., scheduled). For example, schematic view 200, 200*b* includes the same sub-graphs 210*a*, 210*c* as the example of schematic view 200*a*. However, here, the graph slicer 202 has slices the sub-graph 210*b* into two separate sub-graphs 210*b*, 210*ba*, 210*bb*. In this example, the sub-graph 210*ba* must execute prior to the sub-graph 210*bb*, as the sub-graph 210*bb* is dependent upon a result of the sub-graph 210*ba*.

Referring back to FIG. 1, the graph engine executor 160 also includes a graph scheduler 302. The graph scheduler 302 receives the sub-graphs 210 from the graph slicer 202. For each sub-graph 210, the graph scheduler 302 determines a computational cost 310 of the respective sub-graph 210. The computational cost 310 represents an amount of computational resources to complete the computation. In some implementations, the computational costs 310 of a respective sub-graph 210 include one or more of an amount of CPU resources required to execute the computational jobs of each node 164 of the respective sub-graph 210, an amount of GPU resources required to execute the computational jobs of each node 164 of the respective sub-graph 210, and/or an amount of memory resources required to execute the computational jobs of each node 164 of the respective sub-graph 210. That is, the computational cost 310 may represent a cost for executing a sub-graph 210 and/or one or more nodes 164 of a sub-graph 210 using CPU resources, GPU resources, memory resources and/or any combination of the three.

The graph scheduler 302 distributes each sub-graph 210 to a respective computing device 170, 170*a-n* of a distributed computing system (e.g., of the remote system 140). Each computing device 170 represents independent computing resources 172, 172*a-c*. That is, each computing device 170 includes separate computing resources such as respective CPU resources 172, 172*a*, GPU resources 172, 172*b*, and/or memory resources 172, 172*c*. While examples herein illustrate the computing devices 170 as independent servers, the computing devices 170 may take any form. For example, multiple computing devices 170 are hosted within virtual machines (VMs) on the same hardware. In other examples, some or all computing devices 170 are separate hardware located remote from each other. The computing devices 170 may be a part of the computing resources 144 and memory resources 146 of the remote system 140 and/or in communication with the remote system 140 (e.g., via the network 112). As described in more detail below, the graph scheduler 302 distributes the sub-graphs 210 to the computing devices 170 based on the computational costs 310 of the sub-graphs 210 and the computing resources 172 of the computing devices 170.

Figure 3:
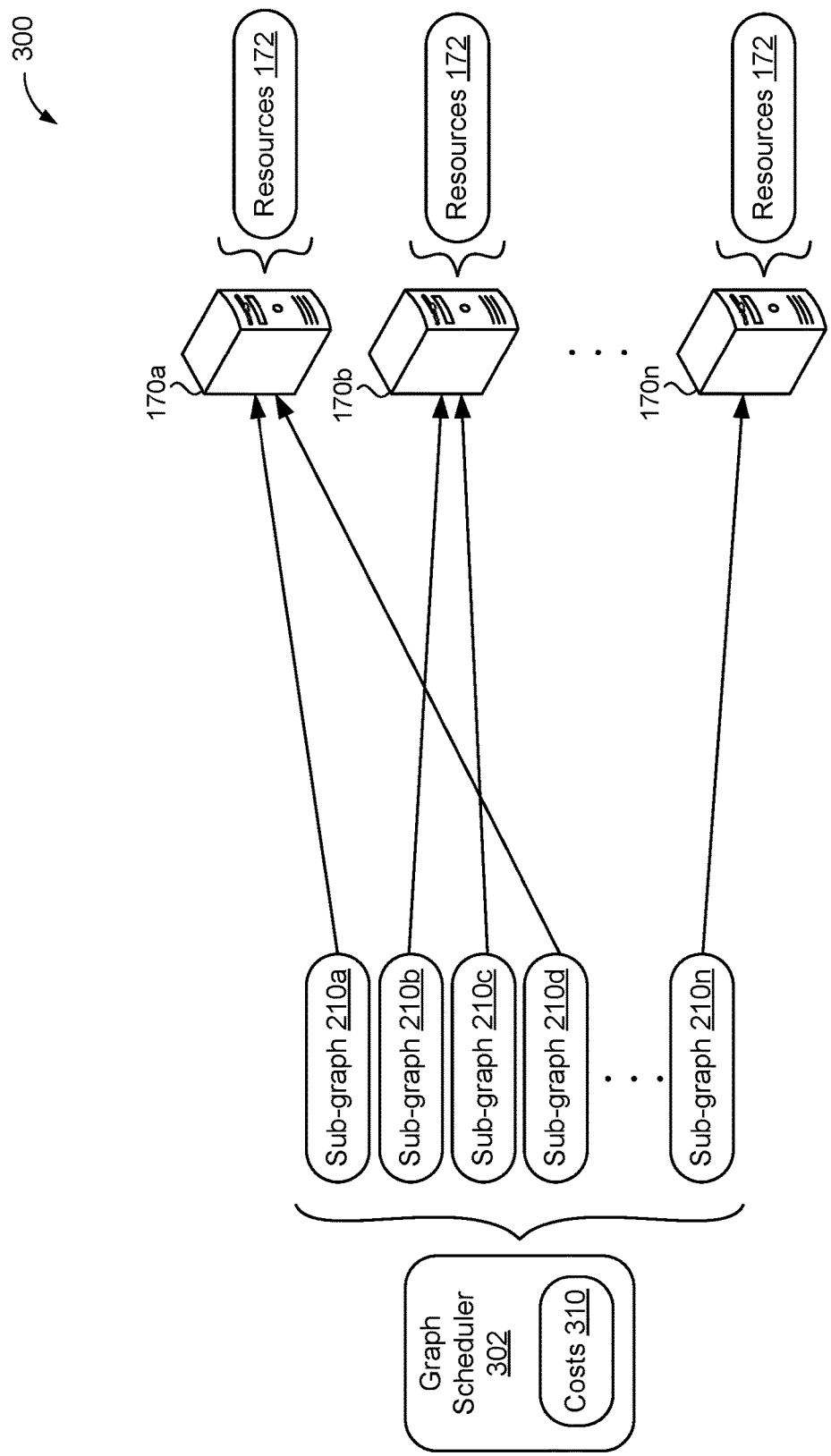
FIG. 3 is a schematic view of a graph scheduler of the system of FIG. 1.

Referring now to FIG. 3, the graph scheduler 302 distributes the sub-graphs 210 to the computing devices 170 based on the computational costs 310 and/or the computing resources 172. Here, schematic view 300 includes the graph scheduler 302 distributing sub-graphs 210a-n to computing resources 170a-n. The graph scheduler 302 evaluates an amount of resources 172 available for each computing device 170 versus the computational cost 310 (i.e., the amount of resources required to execute the computational jobs of the nodes 164 of the sub-graph 210) to efficiently distribute the sub-graphs 210 to maximize a number of sub-graphs 210 that can be executed simultaneously by the computing devices 170 while obeying any dependencies imposed by the edges 166 between sub-graphs 210 (e.g., when the graph slicer 202 divides a sub-graph 210 into two or more sub-graphs 210).

In some implementations, the graph scheduler 302, when distributing the sub-graphs 210, determines whether to execute some or all of a respective sub-graph 210 using CPU resources 172a and/or GPU resources 172b. For example, the graph scheduler 302 estimates a performance of the CPU 172a of the computing device 170 when executing a respective sub-graph 210 (or node 164 of a sub-graph 210). In this example, the graph scheduler 302 also estimates a performance of the GPU 172b of the computing device 170 when executing the same respective sub-graph 210 (or node 164). The graph scheduler 302 may compare the estimated performance of the CPU 172a and the GPU 172b to determine which computing device 170 to distribute the sub-graph 210 and/or whether to have the computing device 170 execute the sub-graph 210 using the CPU 172a or the GPU 172b. In some examples, the computing devices 170 are not homogeneous. For example, the performance of CPUs 172a and GPUs 172b may vary among different computing devices 170. Some computing devices 170 may lack GPUs 172b entirely. The graph scheduler 302 may take into account the specific resources 172 of each computing device 170.

The graph scheduler 302, in some implementations, may assign a cost or weight to CPU resources 172a and GPU resources 172b. The graph scheduler 302 may distribute the sub-graphs 210 among CPU resources 172a and GPU resources 172b at least partially based on the cost or weight and the estimated performances. For example, GPU resources 172b may have a higher cost than CPU resources 172a, so the graph scheduler may only distribute a sub-graph 210 to GPU resources 172b when the performance difference between the CPU resources 172a and the GPU resources 172b satisfy a threshold value (e.g., when the GPU 172b sufficiently outperforms the CPU 172a). The threshold may adjust based on an importance of a sub-graph 210 or node 164. For example, when a particular node 164 or sub-graph is a bottleneck to future computations (i.e., other nodes 164 and/or sub-graphs 210 are dependent upon the node 164 or sub-graph 210), the graph scheduler 302 lowers the threshold such that a smaller performance difference between the CPU resources 172a and the GPU resources 172b is required. In some examples, the graph scheduler 302 employs a machine learning (ML) model to determine whether to execute sub-graphs 210 on CPU resources 172a or GPU resources 172b and/or which computing devices 170 to select.

In some examples, when scheduling or distributing the sub-graphs 210 among the computing devices 170, the graph scheduler 302 prunes or removes redundant computations (i.e., redundant nodes 164 and/or sub-graphs 210). For example, when the graph slicer 202 provides multiple sub-graphs 210 and two or more of the sub-graphs 210 are identical, the graph scheduler 302 distributes only one of the redundant sub-graphs 210 to the computing devices 170 and caches or otherwise saves the corresponding result 410 to apply to other sub-graphs 210 when applicable.

Referring now to FIG. 4, each computing device 170 that receives one or more sub-graphs 210 determines a result 410, 410a-n for each received sub-graph 210. That is, each respective computing device 170 determines the result for each sub-graph 210 by executing the computational jobs associated with each node 164 within the sub-graph 210 in an order imposed by the edges 166. The computing devices 170 may compute the results 410 asynchronously from each other computing device 170. In the example of schematic view 400, each computing device 170 sends a single result 410, however the computing devices 170 may each send multiple results 410 depending on the number of sub-graphs 210 received from the graph scheduler 302. That is, a single computing device 170 may receive and execute many sub-graphs 210 (in parallel, in series, or in a combination of the two). The graph engine executor 160 receives each result 410 from the computing devices 170 of the distributed computing system. Using each result 410, the graph engine executor 160 determines a total result 420. For example, when the request 20 is to determine a total value of a portfolio, the graph engine executor 160 sums each result 410 (with each result 410 corresponding to a value of one or more of the instruments of the portfolio) to obtain the total result 420 (i.e., the total value). Depending on the request 20 and the computations of the nodes 164, the graph engine executor 160 may perform any number of operations to generate the total result 420. In some implementations, the total result 420 includes multiple values, such as a total value of a portfolio and a risk of the portfolio. The graph engine executor 160 (e.g., using one or more graphs 162 and/or sub-graphs 210) may determine the risk based on derivatives. For example, the computational jobs of one or more nodes 164 represent functions to determine the value of one or more instruments of the financial portfolio. The graph engine executor 160, in some implementations, determines a derivative of these functions to determine the risk of the respective instruments. In some examples, the graph engine executor 160 performs automatic differentiation as opposed to, for example, finite differences.

Figure 5:
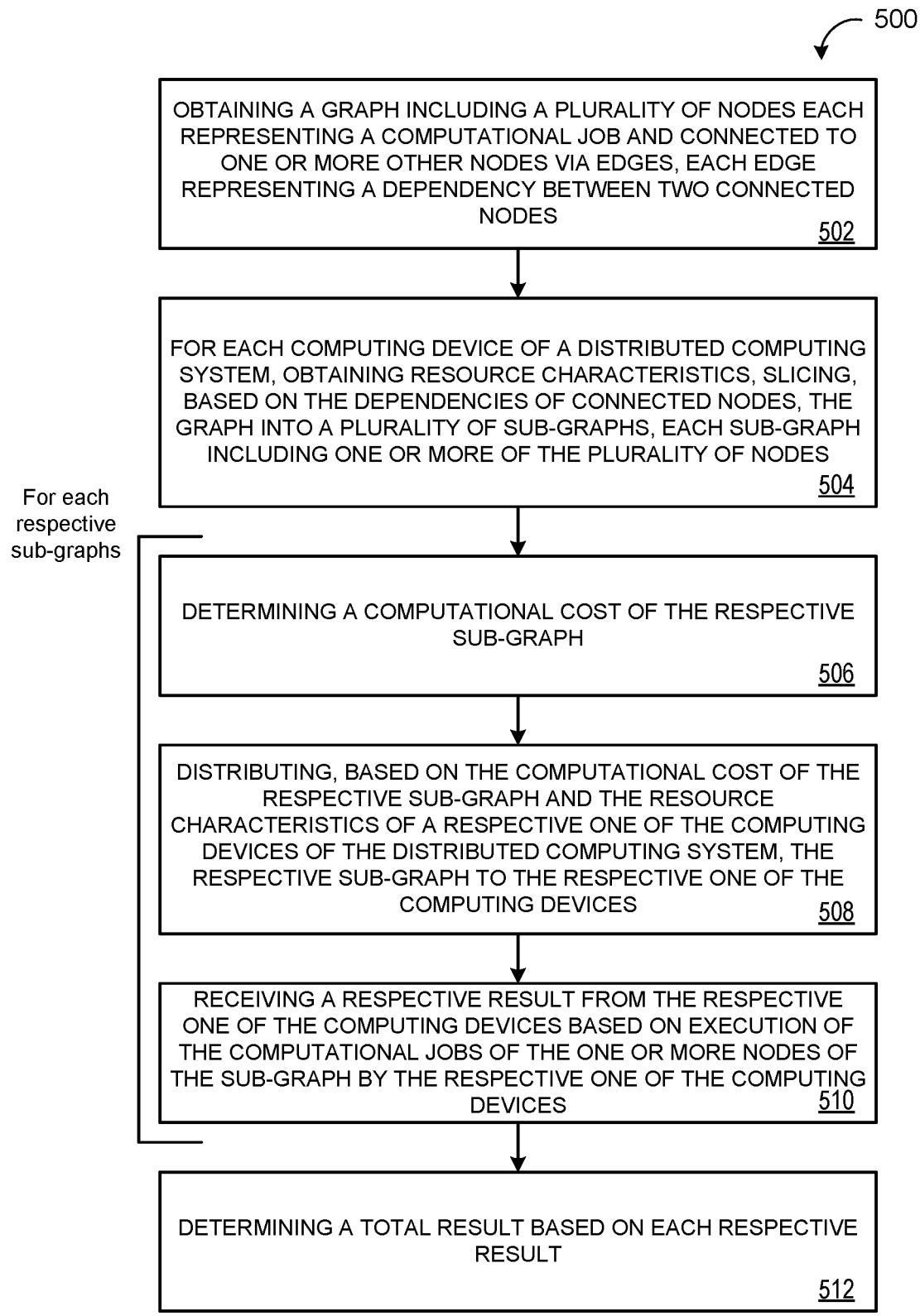
FIG. 5 is a flowchart of an example arrangement of operations for a method of performing large-scale computations using graphs.

FIG. 5 is a flowchart of an exemplary arrangement of operations for a method 500 of performing large-scale computations using graphs. The method 500, at operation 502, includes obtaining a graph 162 that includes a plurality of nodes 164. Each node 164 represents a computational job and is connected to one or more other nodes 164 via edges 166. Each edge 166 represents a dependency between two connected nodes 164. The method 500, at operation 504 includes, for each computing device 170 of a distributed computing system 140, obtaining resource characteristics 172. At operation 506, the method 500 includes slicing, based on the dependencies of connected nodes 164, the graph 162 into a plurality of sub-graphs 210. Each sub-graph 210 includes one or more of the plurality of nodes 164. For each respective sub-graph 210 of the plurality of sub-graphs 210, the method 500 includes, at operation 506, determining a computational cost 310 of the respective sub-graph 210. At operation 508, the method 500 includes distributing, based on the computational cost 310 of the respective sub-graph 210 and the resource characteristics 172 of a respective one of the computing devices 170 of the distributed computing system 140, the respective sub-graph 210 to the respective one of the computing devices 170. At operation 510, the method 500 includes receiving a respective result 410 from the respective one of the computing devices 170. The respective result 410 is based on execution of the computational jobs of the one or more nodes 164 of the sub-graph 210 by the respective one of the computing devices 170. The method 500, at operation 512, includes determining a total result 420 based on each respective result 410.

Figure 6:
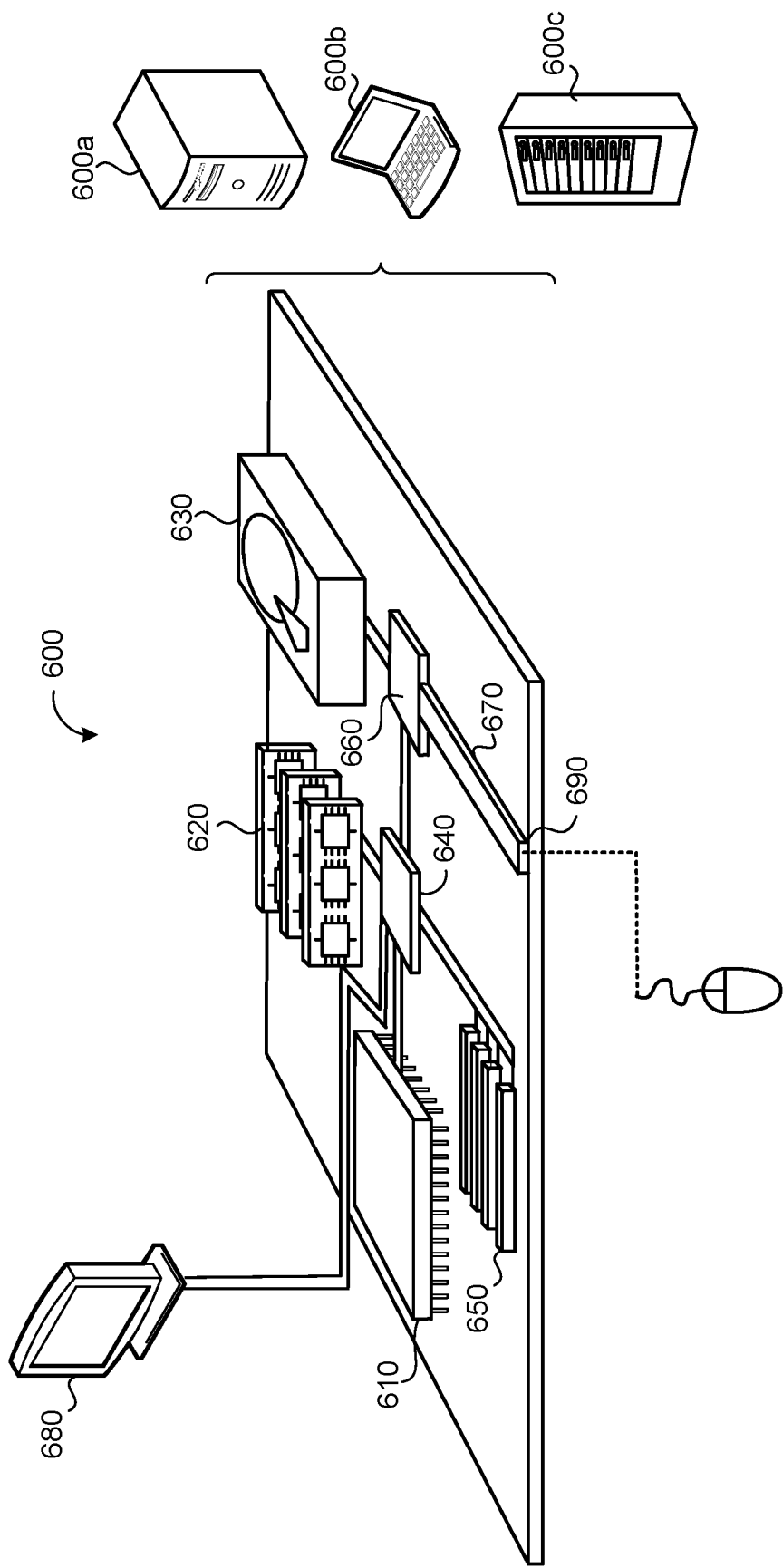
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   for each of multiple computing devices of a distributed computing system, obtaining resource characteristics;
   obtaining a graph comprising a plurality of nodes, each node representing a computational job and connected to one or more other nodes via edges, each edge representing a dependency between two connected nodes, wherein a size of the graph is too large to fit within memory of any single computing device of the multiple computing devices;
   slicing, based on the dependencies of connected nodes, the graph into a plurality of sub-graphs, each sub-graph comprising one or more nodes of the plurality of nodes, each sub-graph of the plurality of sub-graphs comprising a size that is less than a threshold size limit;
   for each respective sub-graph of the plurality of sub-graphs:
      determining a computational cost of the respective sub-graph;
      distributing, based on the computational cost of the respective sub-graph and the resource characteristics obtained for each of the multiple computing devices of the distributed computing system, the respective sub-graph to a respective one of the computing devices; and
      receiving a respective result from the respective one of the computing devices, the respective result based on execution of the computational jobs of the one or more nodes of the sub-graph by the respective one of the computing devices; and
   determining a total result based on each respective result.

2. The method of claim 1, wherein the operations further comprise receiving a request to determine a total value of a financial portfolio, the financial portfolio comprising a plurality of instruments.

3. The method of claim 2, wherein the total result comprises the total value of the financial portfolio.

4. The method of claim 3, wherein the operations further comprise determining a risk of the financial portfolio, the risk based on a derivative of a function of one or more of the computational jobs represented by the plurality of nodes.

5. The method of claim 1, wherein the resource characteristics comprise at least one of central processing unit (CPU) resources, graphical processing unit (GPU) resources, or memory resources.

6. The method of claim 1, wherein the computational cost comprises at least one of:
   an amount of central processing unit (CPU) resources required to execute the computational jobs represented by the one or more nodes of the respective sub-graph;
   an amount of graphical processing unit (GPU) resources required to execute the computational jobs represented by the one or more nodes of the respective sub-graph; or
   an amount of memory resources required to execute the computational jobs represented by the one or more nodes of the respective sub-graph.

7. The method of claim 1, wherein determining the total result comprises summing each respective result.

8. The method of claim 1, wherein execution of the computational jobs represented by the one or more nodes of the respective sub-graph by the respective one of the computing devices comprises performing automatic differentiation.

9. The method of claim 1, wherein distributing the respective sub-graph to the respective one of the computing devices comprises determining whether to execute the respective sub-graph using a central processing unit (CPU) or a graphical processing unit (GPU).

10. The method of claim 9, wherein determining whether to execute the respective sub-graph using the CPU or the GPU comprises:
    estimating a performance of the CPU when executing the respective sub-graph;
    estimating a performance of the GPU when executing the respective sub-graph; and
    comparing the performance of the CPU and the performance of the GPU.

11. The method of claim 9, wherein determining whether to execute the respective sub-graph using the CPU or the GPU is based on dependencies of the respective sub-graph.

12. A system comprising:
data processing hardware; and
memory hardware in communication with the data processing hardware, the memory hardware storing instructions that when executed on the data processing hardware cause the data processing hardware to perform operations comprising:
 for each of multiple computing devices of a distributed computing system, obtaining resource characteristics;
 obtaining a graph comprising a plurality of nodes, each node representing a computational job and connected to one or more other nodes via edges, each edge representing a dependency between two connected nodes, wherein a size of the graph is too large to fit within memory of any single computing device of the multiple computing devices;
 slicing, based on the dependencies of connected nodes, the graph into a plurality of sub-graphs, each sub-graph comprising one or more nodes of the plurality of nodes, each sub-graph of the plurality of sub-graphs comprising a size that is less than a threshold size limit;
 for each respective sub-graph of the plurality of sub-graphs:
  determining a computational cost of the respective sub-graph;
  distributing, based on the computational cost of the respective sub-graph and the resource characteristics obtained for each of the multiple computing devices of the distributed computing system, the respective sub-graph to a respective one of the computing devices; and
  receiving a respective result from the respective one of the computing devices, the respective result based on execution of the computational jobs of the one or more nodes of the sub-graph by the respective one of the computing devices; and
 determining a total result based on each respective result.

13. The system of claim 12, wherein the operations further comprise receiving a request to determine a total value of a financial portfolio, the financial portfolio comprising a plurality of instruments.

14. The system of claim 13, wherein the total result comprises the total value of the financial portfolio.

15. The system of claim 14, wherein the operations further comprise determining a risk of the financial portfolio, the risk based on a derivative of a function of one or more of the computational jobs represented by the plurality of nodes.

16. The system of claim 12, wherein the resource characteristics comprise at least one of central processing unit (CPU) resources, graphical processing unit (GPU) resources, or memory resources.

17. The system of claim 12, wherein the computational cost comprises at least one of:
 an amount of central processing unit (CPU) resources required to execute the computational jobs represented by the one or more nodes of the respective sub-graph;
 an amount of graphical processing unit (GPU) resources required to execute the computational jobs represented by the one or more nodes of the respective sub-graph; or
 an amount of memory resources required to execute the computational jobs represented by the one or more nodes of the respective sub-graph.

18. The system of claim 12, wherein determining the total result comprises summing each respective result.

19. The system of claim 12, wherein execution of the computational jobs represented by the one or more nodes of the respective sub-graph by the respective one of the computing devices comprises performing automatic differentiation.

20. The system of claim 12, wherein distributing the respective sub-graph to the respective one of the computing devices comprises determining whether to execute the respective sub-graph using a central processing unit (CPU) or a graphical processing unit (GPU).

21. The system of claim 20, wherein determining whether to execute the respective sub-graph using the CPU or the GPU comprises:
 estimating a performance of the CPU when executing the respective sub-graph;
 estimating a performance of the GPU when executing the respective sub-graph; and
 comparing the performance of the CPU and the performance of the GPU.

22. The system of claim 20, wherein determining whether to execute the respective sub-graph using the CPU or the GPU is based on dependencies of the respective sub-graph.

* * * * *